US006381129B1

(12) United States Patent
Shimada et al.

(10) Patent No.: US 6,381,129 B1
(45) Date of Patent: Apr. 30, 2002

(54) PORTABLE INFORMATION PROCESSING APPARATUS

(75) Inventors: Isao Shimada, Kakogawa; Hideki Harada, Kobe; Junichi Kubota, Mino-gun; Akihiro Kuranaga, Kobe, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/654,264

(22) Filed: Sep. 1, 2000

(30) Foreign Application Priority Data

Sep. 3, 1999 (JP) ............................................ 11-250024

(51) Int. Cl.$^7$ ................................................ G06F 1/16
(52) U.S. Cl. ........................ 361/683; 361/740; 292/148; 70/57
(58) Field of Search ................................ 361/683–686, 361/724–727, 740, 759; 364/708.1; 248/551–553; 312/216, 218; 70/57–58, 85; 292/42, 148, 151, 307 R

(56) References Cited

U.S. PATENT DOCUMENTS

| 5,506,749 A | | 4/1996 | Matsuda ........................ 361/683 |
| 5,738,536 A | | 4/1998 | Ohgami et al. ................ 361/683 |
| 5,768,098 A | * | 6/1998 | Murayama .................... 361/684 |
| 5,825,616 A | * | 10/1998 | Howell et al. ................ 361/684 |

FOREIGN PATENT DOCUMENTS

| EP | 0 759 589 | 2/1997 |
| WO | 91 20072 | 12/1991 |

* cited by examiner

Primary Examiner—Leo P. Picard
Assistant Examiner—Hung Van Duong
(74) Attorney, Agent, or Firm—Wenderoth, Lind & Ponack, L.L.P.

(57) ABSTRACT

An extension device 5 is engaged in a connector provided on one side of a lower case 102 of a cabinet 100 of an PIP apparatus PI. An adjustable foot 6 is provided on the bottom surface 102u to adjust the extension device 5 and the cabinet 100 in height. Therefore, the cabinet 100 can be horizontally placed on a plane. When the extension device 6 is approximately equal in height to the lower case 102, the adjustable foot is retracted into the lower case 102. Therefore, the thickness of the PIP apparatus PI can be minimized.

16 Claims, 4 Drawing Sheets

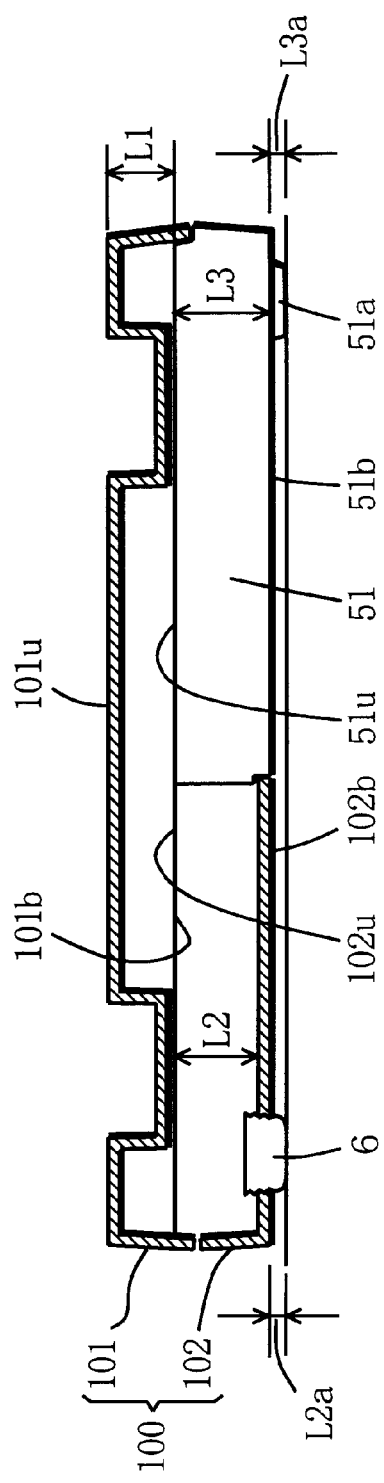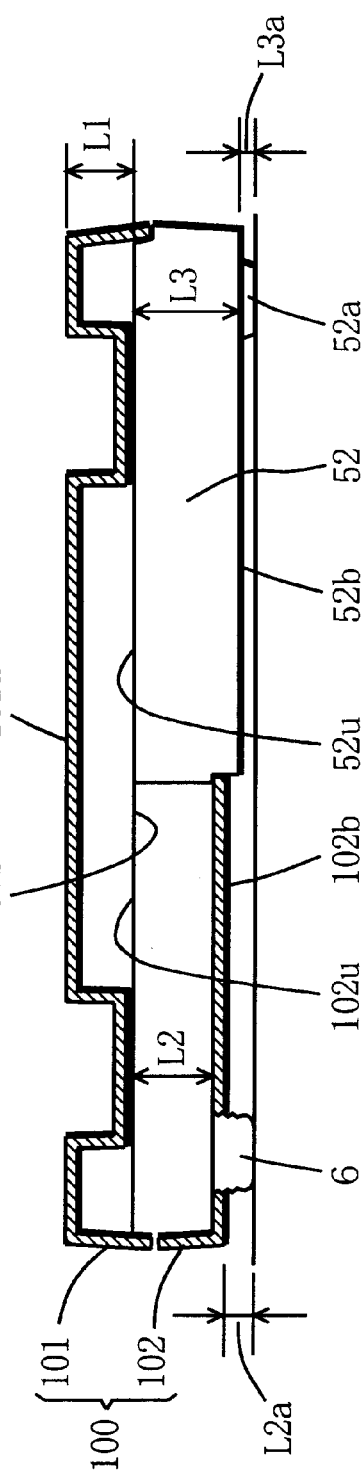

PORTABLE INFORMATION PROCESSING APPARATUS

BACKGROUND OF THE INVENTION

1. Field of the Invention

The present invention relates to portable information processing apparatuses and, more specifically, to a portable information processing apparatus capable of accommodating an extension apparatus, typically a disk drive, as a storage apparatus and battery.

2. Description of the Background Art

In recent years, portable information processing apparatuses, typically notebook PCs, often accommodate disk drives such as CD (Compact Disk), DVD, and FD (Floppy Disk) drives. Also, some PCs may accommodate a second battery pack to extend its drive time when carried. However, not all of these extension devices can be accommodated at once in a thin, lightweight portable information processing apparatus. Therefore, one of these devices is selected for use as required, and is installed in a bay of the portable information processing apparatus.

With reference to FIG. 5, a portable information processing apparatus is now described. In FIG. 5, a perspective view of the conventional portable information device viewed from the rear bottom thereof is shown. The conventional portable informant apparatus PIP apparatus PIc , abbreviated to PIP apparatus PIc for the sake of brevity, includes a cabinet 41, and a display unit 42 movably mounted on the cabinet 41 with a hinge 43. A U-shaped bay 41a is provided on one side of the cabinet 41 for installing an extension device 45 such as a disk drive in a detouchable manner. The extension device 45 has a connector (not shown) for removably engaging another connector (not shown) provided inside the bay 41a of the cabinet 41. The bay 41a is formed so that its height L5 is larger than a thickness L6 of the extension device (L5>L6).

The installation of an extension device 45 in the PIP apparatus PIc is now described. Specifically, in this example, an FD drive, or the extension device 45, is inserted into the bay 41a. To read data from a CD by PIP apparatus PIc, the user first operates an eject mechanism (not shown) to eject the FD drive currently installed in the bay 41a, and then insert a CD drive into the connector of the bay 41a until being engaged therewith. However, in PIP apparatus PIc, the extension device having a maximum outer dimension defines the shape of bay 41a in size. This also defines the total thickness of the PIP apparatus PIc. Therefore, although low-profile extension devices are available with recent advanced technology, the height L5 of the bay 41a is still required to be enough to accommodate the existing bulky extension devices. Consequently, reduction in thickness of the entire portable information processing apparatus is difficult to achieve.

SUMMARY OF THE INVENTION

Therefore, an object of the present invention is to achieve reduction in thickness of a portable information processing apparatus without impairing its extensibility.

According to a first aspect of the present invention, a portable information processing apparatus formed of a cabinet comprising an upper case and a lower case that are attached to each other, wherein an extension device is detoucheably connected to the lower case to form at least part of a bottom surface of the cabinet. Therefore, reduction in thickness of the portable information processing apparatus can be achieved.

According to a second aspect of the present invention, in the first aspect, one of a plurality of extension devices varied in thickness can be installed as being protruding downward further than the lower surface of the upper case.

According to a third aspect of the present invention, in the first aspect, an adjustable foot is provided on the bottom surface of the lower case, the adjustable foot capable of being adjusted in height approximately equal to any one of the extension device and the foot provided on the extension device.

According to a fourth embodiment of the present invention, in the third aspect, the extension device and the adjustable foot are arranged rearward on the bottom surface of the cabinet as opposed to each other.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4A is a front sectional view showing the portable information processing apparatus accommodating an extension device whose bottom line is aligned with that of bottom surface thereof;

FIG. 4B is a front sectional view similar to FIG. 4A, but the bottom line of accommodated extension device is not aligned with that of bottom surface thereof.

DESCRIPTION OF THE PREFERRED EMBODIMENTS

With reference to FIGS. 1, 2, 3, 4A, and 4B, a portable information processing apparatus according to one embodiment of the present invention is described below.

Figure 1:
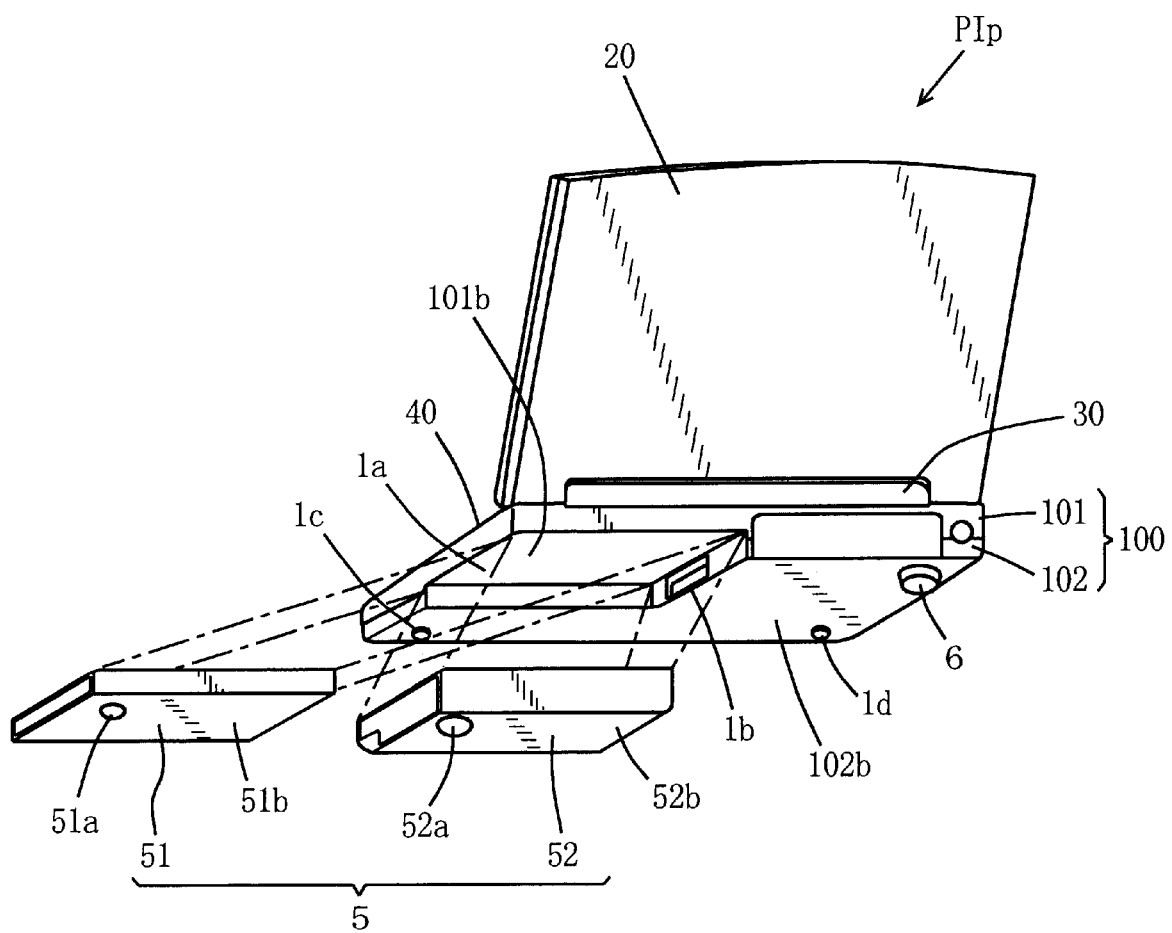
FIG. 1 is a perspective view showing an portable information processing apparatus, according to one embodiment of the present invention, whose bay is not occupied by an extension device.
Figure 2:
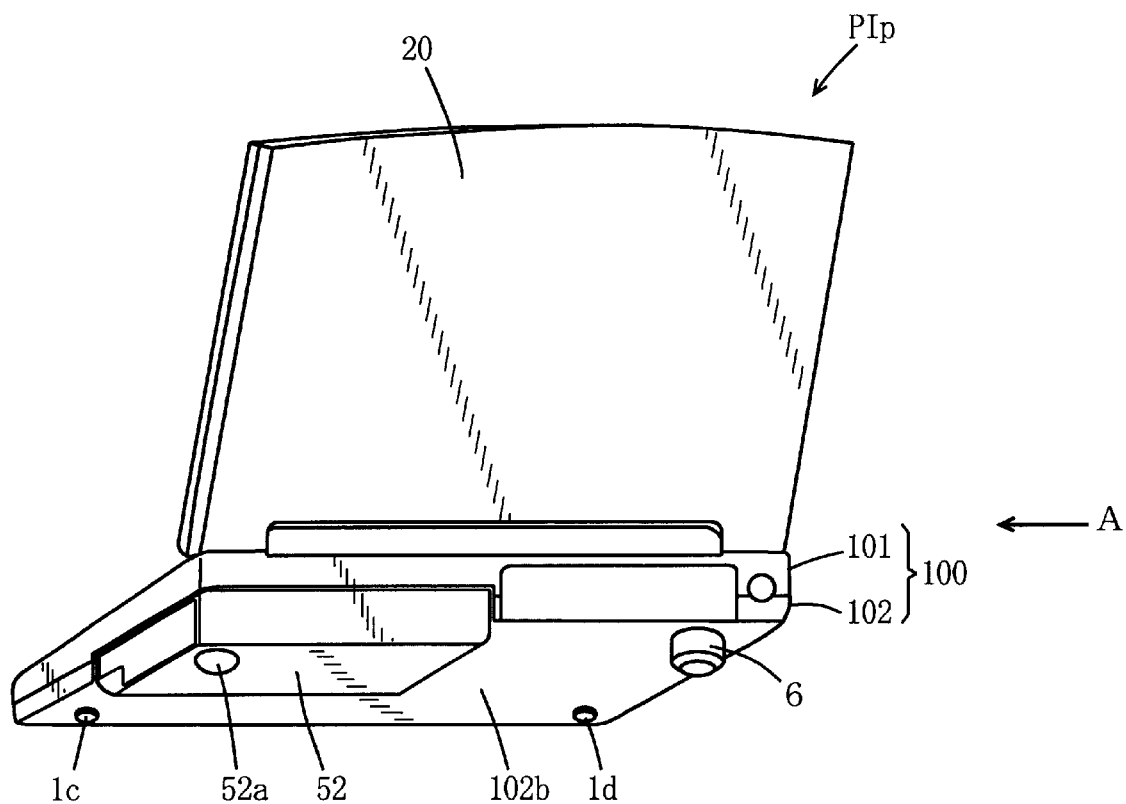
FIG. 2 is also a perspective view similar to FIG. 1, but the bay is occupied by extension device.

FIGS. 1 and 2 are perspective views of a portable information processing apparatus according to the embodiment of the present invention. In FIG. 1, a portable information processing apparatus, abbreviated as PIP apparatus PI for the sake of brevity, with two types (thin and thick) of extension devices before being installed therein is shown. In FIG. 2, the PIP apparatus PI with a thick type extension device being installed therein is shown.

FIGS. 4A and 4B are front sectional views of the PIP apparatus PI. In FIG. 4A, a state when a thin extension device is installed therein is shown. In FIG. 4B, a state when a thick extension device is installed therein is shown.

As best shown in FIG. 1, the PIP apparatus PI is composed of a cabinet 100, a display unit 20, a hinge 30, and a keyboard 40 (not shown). The display unit 20 is detaoucheably mounted on the cabinet 100 with the hinge 30. The cabinet 100 is composed of an upper case 101 and a lower case 102 that are attached together on a lower surface 101b of the upper case 101 and an upper surface 102u (not shown) of the lower case 102. A part of the lower case 102 is removed and opened to the air for accommodating an extension device 5 as engaged with each other by connector 1b provided thereto and connector (not shown) of the extension device 5. This place is referred to as "open bay 1a" distinguishable from the conventional bay 41a.

In FIG. 1, an FD drive 51 and a CD drive 52 are shown as examples of the extension device 5. However, the extension device 5 is not limited to the above, and may be a DVD drive or a second battery pack. The extension device 5 is detaoucheably engaged in the connector 10b so as to form the entire bottom surface of the cabinet together with the bottom surface 102b of the lower case 102.

The extension device 5 is provided with a foot on its bottom surface. This foot is unique to each type of extension devices, and not variable its projection length measured from the bottom surfaces of extension device and top end thereof. This type of foot is referred to as "fixed foot".

Figure 3:
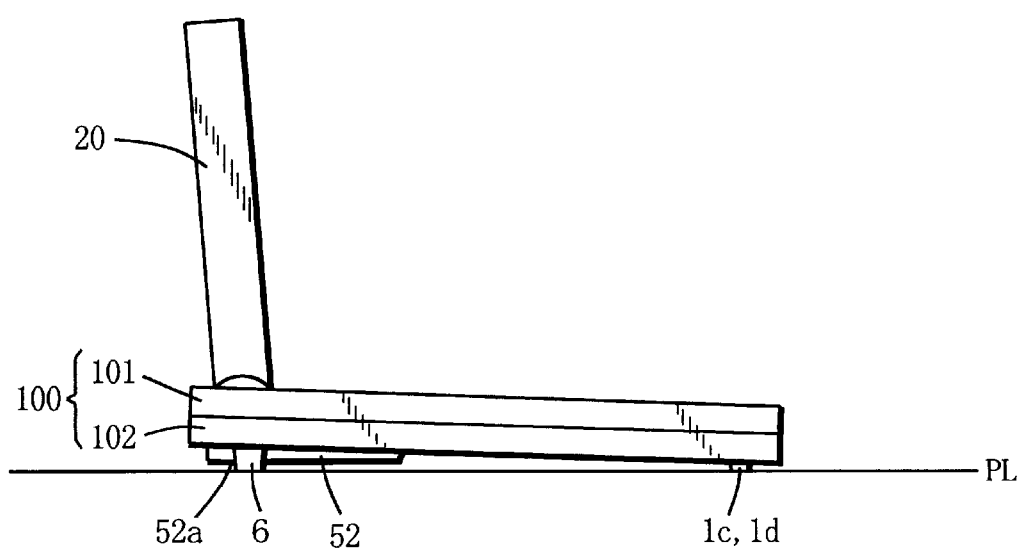
FIG. 3 is a side view showing the portable information processing apparatus of FIG. 2 placed on a plane PL.
Figure 5:
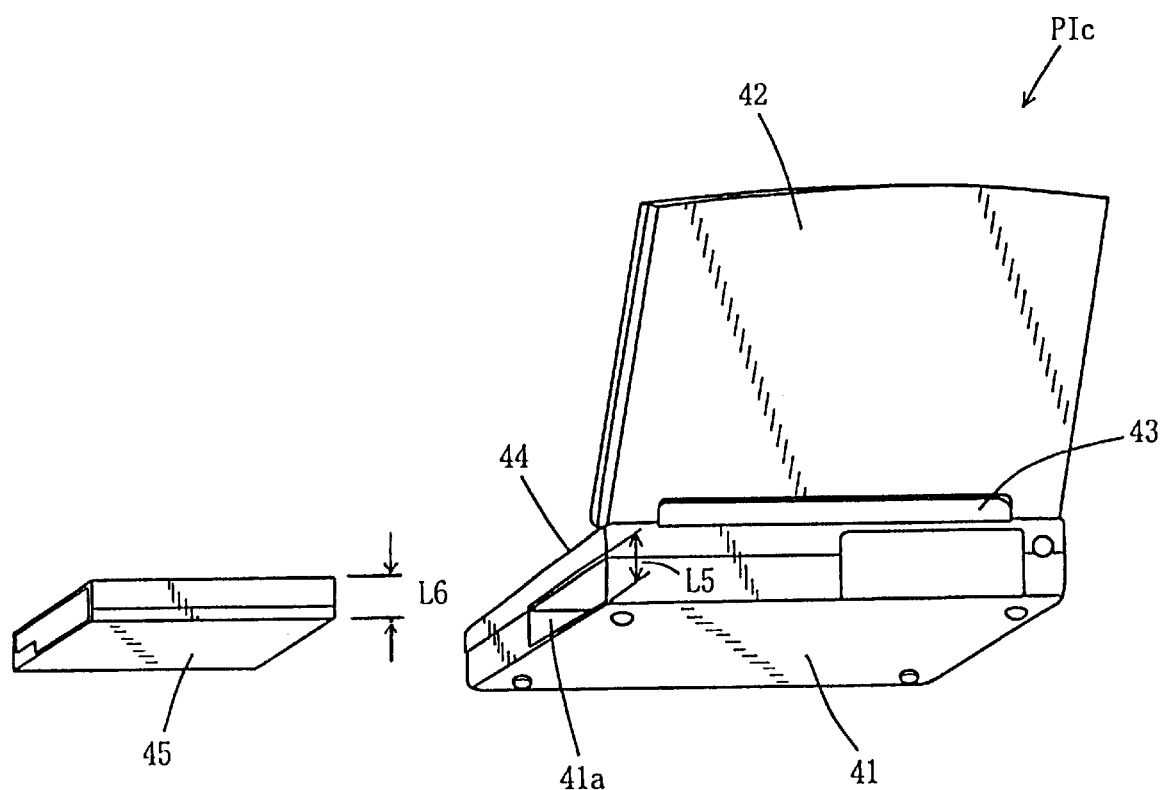
FIG. 5 is a perspective view showing a conventional information processing apparatus accommodating an extension device therein.

As best shown in FIG. 3, this projection length defines the gap between a table and the bottom line of the PIP apparatus PI. In this sense, the projection length is referred to as "foot height or height".

In FIG. 1, the FD drive 51 is provided with a fixed foot 51a on its bottom surface 51b, and the CD drive 52 with a fixed foot 52a on its bottom surface 52b. The cabinet 100 is provided with fixed feet 1c and 1d at the front on its bottom surface 102b, and also an adjustable foot 6, at the rear thereon as opposed to the foot of the extension device 5.

Note that the adjustable foot 6 can be adjusted its foot height or height measure from the bottom surface 102b. According to this embodiment, the adjustable foot 6 is so constructed to be rotated for the adjusting its height in a stepless manner. Thus, the adjustable foot 6 can supports the PIP apparatus PI at the preferable horizontal level together with the fixed feet 1c, 1d, and 51a (or 51b) of the extension device 5.

The height adjustment of the above-structured portable information processing apparatus IP is described below. As typically shown in FIG. 2, the extension device 5 is installed so that the connector thereof is engaged in the connector 1b.

Here, as shown in FIGS. 4A and 4B, a height L1 of the upper case 101 is defined by a distance between the upper surface 101u and the lower surface 101b. A height L2 of the lower case 102 is defined by a distance between the upper surface 102u and the bottom surface 102b. A height L3 is defined by a distance between the upper surface 5u (51u, 52u) and the bottom surface 5b (51b, 52b).

Furthermore, a height L2a is defined by a distance between the bottom surface 102b of the lower case 102 and the plane PL. A height L3a is defined by a distance between the bottom surface 5b (51b, 52b) of the extension device 5 (51, 52) and the plane PL.

In FIG. 4A, the case where the FD drive 51 is accommodated as one example of a thin external device is shown. Here, assume L2>L3. In this case, the adjustable foot 6 is rotated in a retractive direction for adjustment to satisfy L2+L2a≈L3+L3a. With this adjustment, the information processing apparatus 1 becomes not tilted, and placed in an approximately horizontal position. In this case, the total height of the cabinet 100(=L1+L2+L2a) becomes minimum.

In FIG. 4B, the case where the CD drive 52 is accommodated as one example of a thick external device is shown. To read data from a CD to the PIP apparatus PI, the user removes the FD drive 51 from the connector 10b in the open bay 1a, and then insert the CD drive 52 in the open bay 1a to engage. Here, assume L2<L3. In this case, the adjustable foot 6 is rotated in a protruding direction for adjustment to satisfy the above equation L2+L2a≈L3+L3a. After this adjustment, the front part of the cabinet 100 having the feet 1c and 1d becomes lower in height than the rear part having the adjustable foot 6 and the foot 52a of the CD drive 52. That is, the surface of the keyboard 40 is tilted toward the front, as shown in FIG. 3. Therefore, the user can easily type on the keyboard.

In the case where L2=L3 (not shown), the adjustable foot 6 is adjusted so as to be approximately equal in height to the foot (51a or 52a) of the extension device 5 (L2a≈L3a).

Note that the foot (51a or 52a) of the extension device 5 is not necessarily required. In this case, the equation to be satisfied in both of the above first two cases (FIGS. 4A and 4B) is L2+L2a=L3. In the last case (not shown), the adjustable foot 6 is totally retracted into or removed from the lower case 102.

As such, in the present embodiment, the extension device is installed to form at least part of the bottom surface of the cabinet. Therefore, a thinner portable information processing apparatus can be achieved.

Further, the total thickness of the cabinet is defined by the height of the extension device installed. This can also contribute to reduction in thickness of the portable information processing apparatus.

Still further, only by adjusting the adjustable foot of the cabinet, extension devices varied in thickness can be exchangeably accommodated. In other words, there is no need to remodel the cabinet itself for each extension device. This enhances the possibilities of the portable information processing apparatus at low cost.

In the present embodiment, the FD drive is exemplarily described as a thin extension device, and the CD drive as a thick extension device. However, any extension device can be installed such as a DVD drive and second battery pack.

As stated above, in the present invention, the cabinet can be structured irrespectively of the thickness of the removable extension device installed therein. This is quite effective for reduction in thickness of the portable information processing apparatus. Furthermore, even a thicker extension device can be installed by adjusting the adjustable foot of the cabinet. This increases extensibility of the portable information processing apparatus.

The followings are apparent from the above descriptions. In the portable information processing apparatus of the present invention, an extension device is detouheably installed on the rear bottom of the cabinet. The bottom surface of the extension device forms at least part of the entire bottom surface of the cabinet.

Also, an adjustable foot is provided on the bottom surface of the cabinet as opposed to the extension device or a foot provided on the extension device. The adjustable foot can be adjusted in height approximately equal to the extension device or a foot provided on the extension device.

If a thicker extension device is installed, it protrudes downward further than the cabinet. At this time, the adjustable foot is adjusted in height so that the entire cabinet can horizontally placed on a plane as being titled toward front. On the other hand, if a thinner extension device that is approximately equal in height to the lower case, the adjustable foot is retracted so that the total thickness of the cabinet can be minimized.

With the above structure, reduction in thickness of the portable information processing apparatus can be achieved irrespectively of the thickness of the extension device. For increasing the portability, a thinner extension device is selected to be installed. For increasing the extendability, even a thicker extension device can be installed with adjustment in height by the adjustable foot.

While the invention has been described in detail, the foregoing description is in all aspects illustrative and not restrictive. It is understood that numerous other modifications and variations can be devised without departing from the scope of the invention.

What is claimed is:

1. A portable information processing apparatus for use with an extension device, said portable information processing apparatus comprising:
    a case comprising a bottom having an open bay for detachably receiving the extension device, said open bay having a depth such that the extension device, when received in said open bay, protrudes below said bottom of said case by a protrusion amount; and
    an adjustable support foot provided on said bottom of said case, said adjustable support foot being adjustable in height such that a height of said adjustable support foot from said bottom of said case is approximately equal to the protrusion amount of the extension device.

2. A portable information processing apparatus according to claim 1, wherein said open bay and said adjustable support foot are arranged rearward opposite to one another on said bottom of said case.

3. A portable information processing apparatus according to claim 1, wherein said case comprises an upper case and a lower case that are attached to each other, said open bay being located in said lower case.

4. A portable information processing apparatus according to claim 1, wherein the extension device has a support foot, and the protrusion amount is from said bottom of said case to a bottom of the support foot of the extension device.

5. A portable information processing apparatus comprising:
    an extension device;
    a case comprising a bottom having an open bay for detachably receiving said extension device, said open bay having a depth such that said extension device, when received in said open bay, protrudes below said bottom of said case by a protrusion amount; and
    an adjustable support foot provided on said bottom of said case, said adjustable support foot being adjustable in height such that a height of said adjustable support foot from said bottom of said case is approximately equal to the protrusion amount of said extension device.

6. A portable information processing apparatus according to claim 5, wherein said open bay and said adjustable support foot are arranged rearward opposite to one another on said bottom of said case.

7. A portable information processing apparatus according to claim 5, wherein said case comprises an upper case and a lower case that are attached to each other, said open bay being located in said lower case.

8. A portable information processing apparatus according to claim 5, wherein said extension device comprises a support foot, and the protrusion amount is from said bottom of said case to a bottom of said support foot of said extension device.

9. A portable information processing apparatus for use with an extension device, said portable information processing apparatus comprising:
    a case comprising a bottom having an open bay for detachably receiving the extension device; and
    an adjustable support foot, provided on said bottom of said case, for adjusting a height of said bottom of said case to a height that compensates for any protrusion amount of the extension device below said bottom of said case.

10. A portable information processing apparatus according to claim 9, wherein said open bay and said adjustable support foot are arranged rearward opposite to one another on said bottom of said case.

11. A portable information processing apparatus according to claim 9, wherein said case comprises an upper case and a lower case that are attached to each other, said open bay being located in said lower case.

12. A portable information processing apparatus according to claim 9, wherein the extension device comprises a support foot, and the protrusion amount is from said bottom of said case to a bottom of the support foot of the extension device.

13. A portable information processing apparatus comprising:
    an extension device;
    a case comprising a bottom having an open bay for detachably receiving said extension device; and
    an adjustable support foot, provided on said bottom of said case, for adjusting a height of said bottom of said case to a height that compensates for any protrusion amount of said extension device below said bottom of said case.

14. A portable information processing apparatus according to claim 13, wherein said open bay and said adjustable support foot are arranged rearward opposite to one another on said bottom of said case.

15. A portable information processing apparatus according to claim 13, wherein said case comprises an upper case and a lower case that are attached to each other, said open bay being located in said lower case.

16. A portable information processing apparatus according to claim 13, wherein said extension device comprises a support foot, and the protrusion amount is from said bottom of said case to a bottom of said support foot of said extension device.

* * * * *